R. WARNOCK.
PULSATOR FOR MILKING MACHINES.
APPLICATION FILED AUG. 7, 1915.
1,270,473.
Patented June 25, 1918.
2 SHEETS—SHEET 2.
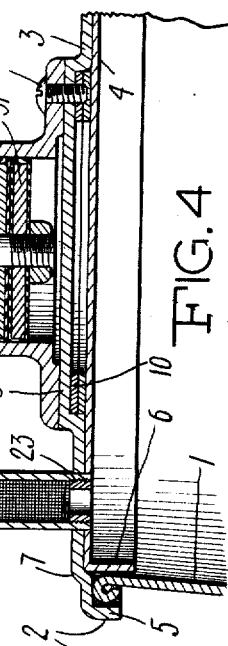
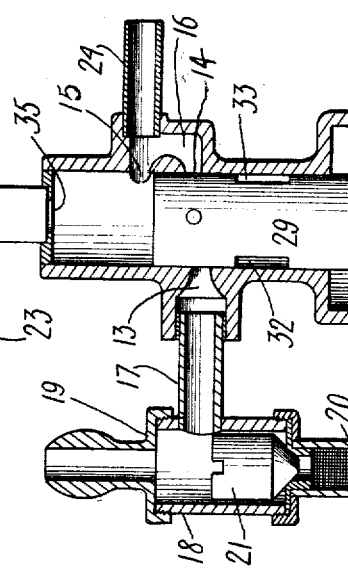
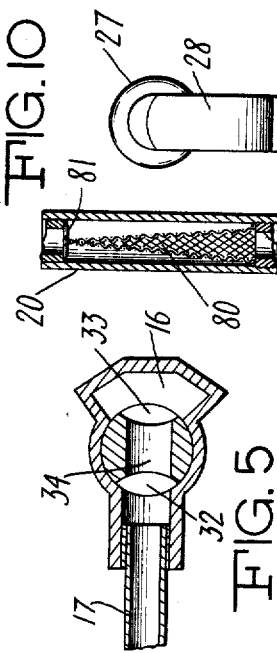
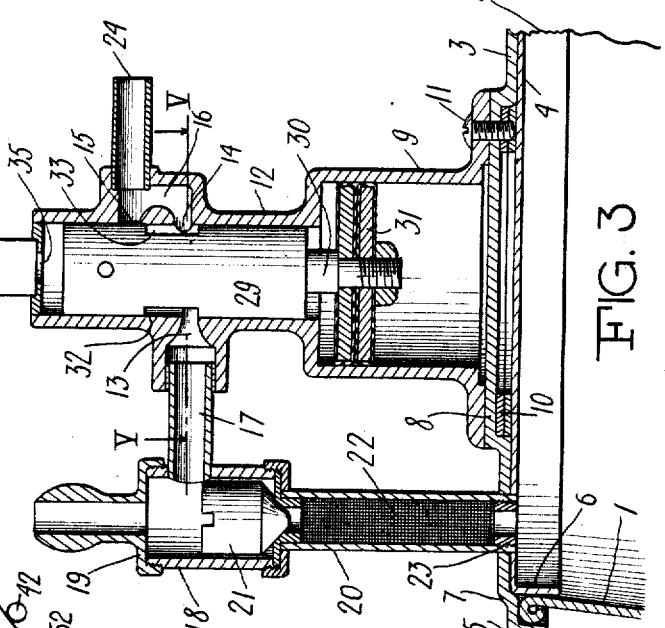
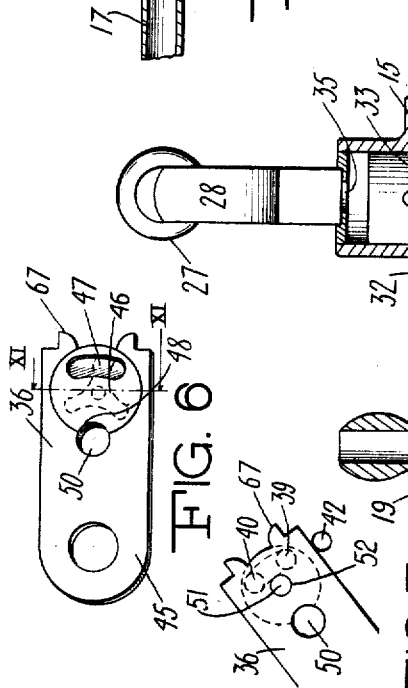
INVENTOR.
Robert Warnock
BY
Edmund Burnigham ATTORNEY

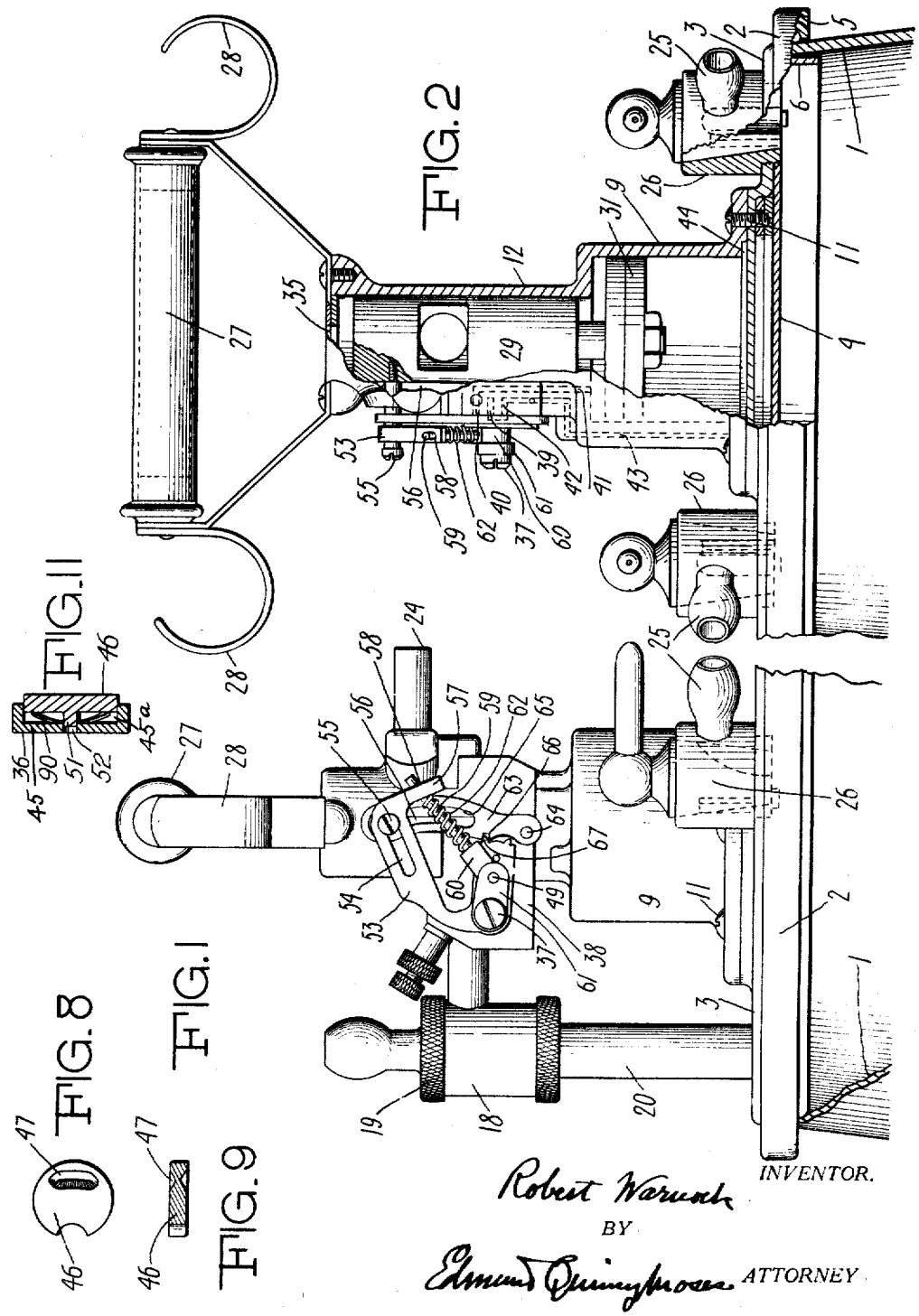

UNITED STATES PATENT OFFICE.

ROBERT WARNOCK, OF BLOOMFIELD, NEW JERSEY, ASSIGNOR TO EMPIRE CREAM SEPARATOR COMPANY, OF BLOOMFIELD, NEW JERSEY, A CORPORATION OF NEW JERSEY.

PULSATOR FOR MILKING-MACHINES.

1,270,473.   Specification of Letters Patent.   Patented June 25, 1918.

Application filed August 7, 1915. Serial No. 44,176.

*To all whom it may concern:*

Be it known that I, ROBERT WARNOCK, a citizen of the United States, residing at Bloomfield, county of Essex, and State of New Jersey, have invented certain new and useful Improvements in Pulsators for Milking-Machines, of which the following is a specification.

This invention relates to milking machines and particularly to pulsator mechanism for machines of the type in which vacuum or pressure is applied intermittently to the teat cups of the apparatus by automatic mechanism operated by the pressure or suction.

It has long been recognized that continuous suction on the cow's teats was very injurious, and various means have therefore been provided for producing intermittent or pulsating action on the teats so as to relieve the same or restore them to their normal condition. For this purpose apparatus has heretofore been devised for automatically cutting off the vacuum at intervals, or for cutting off the vacuum and applying intermittent pressure to the teat, and my present invention relates to improved mechanism for effecting this result.

The present invention relates particularly to the type of pulsator mechanism disclosed in the application of A. C. Macartney, for pulsators for milking machines, filed February 27, 1915, Serial No. 10,904, and embodies certain improvements applicable to the mechanism therein set forth.

Certain novel features embodied in the structure disclosed in this application are accordingly not claimed herein, as they form the subject matter of said application Serial No. 10904. Certain other novel structural features illustrated in this case relating particularly to the construction and arrangement of the pulsator housing and milk cocks are not claimed herein because these features are included in the subject matter of an application of A. C. Macartney, filed August 23, 1913, Serial No. 786287.

In the accompanying drawings, which form a part of this specification, and in which I have illustrated one preferred embodiment of my invention, Figure 1 is a side elevation of pulsator mechanism embodying my improvements. Fig. 2 is a view partly in side elevation and partly in section looking at the pulsator mechanism from a position at right angles to that shown in Fig. 1. Fig. 3 is a vertical section of the apparatus looking at the apparatus from the same point of view as Fig. 1, the pulsator valve being in its upper position. Fig. 4 is a view similar to Fig. 3, with the pulsator valve shown in its lower position. Fig. 5 is a horizontal section on line V—V of Fig. 3. Fig. 6 is a detailed perspective view of the reversing valve and its carrier. Fig. 7 is a view of the opposite side of the reversing valve carrier, the valve seat ports being indicated to show the action of the valve. Fig. 8 is a side view and Fig. 9 a cross-section of a modified form of reversing valve. Fig. 10 is a vertical section of the pipe for exhausting the air from the milk pail illustrating a modified form of strainer or trap. Fig. 11 is a transverse section through the valve carrier and disk taken on line XI—XI of Fig. 6.

Referring to the drawings in detail, the numeral 1 designates a milk receiving pail which is provided with a removable cover 2, upon which the pulsator mechanism is preferably mounted. The milk pail cover may be of any suitable form, but I have shown an improved construction which is satisfactory in use and economical from a manufacturing point of view. As shown, the cover is made in two parts, 3 and 4, each of which may be pressed from sheet metal, the upper part 3 being of slightly larger diameter than the lower part 4, and being bent down around its periphery to form an outer flange 5. The lower part 4 is also bent down to provide an inner flange 6. The upper part preferably has an offset 7 formed therein, with a diameter corresponding to that of the lower part 4, and into which such lower part fits, thereby facilitating the assembling of the parts and insuring proper centering. The flanges 5 and 6 form a groove between them which receives the rim of the milk pail. The engagement of this groove with the rim of the milk pail prevents lateral displacement of the cover on the pail, the cover being normally retained upon the pail during the use of the apparatus by atmospheric pressure as a vacuum is constantly maintained within the pail by the connection of the suction apparatus therewith. The upper member 3 of the cover preferably has its central portion raised as indicated at 8, forming a seat for the cylinder 9 of the pulsator motor, the middle of the upper member being thickened or filling rings 10 inserted in order to provide the necessary stock to hold the screws 11, which are utilized to secure the cylinder to the cover. The parts of the cover may be secured together in any suitable manner, as, for instance, by spot-welding.

Mounted on or formed integral with the cylinder 9 of the pulsator, is the pulsator valve casing 12. Formed in this casing are an outlet port 13 and a pair of inlet ports 14 and 15 connecting with a chamber 16. The port 13 is connected to a source of vacuum by means of a pipe 17 which in the preferred construction shown opens into a casing 18, which has a removable cover 19, the latter being preferably provided with a nipple for connection with the usual flexible pipe (not shown) leading from the vacuum main which extends through the stable. The casing is also connected by means of a pipe 20 with the interior of the milk pail. A vacuum is thus maintained at the port 13 of the pulsator valve casing and within the milk pail. In the casing 18 is mounted an outwardly opening check valve 21, which controls the entrance to the pipe 20, thereby maintaining a vacuum within the milk pail when the flexible supply pipe is disconnected from the nipple. The use of this check valve prevents the inrush of the stable air into the milk pail, and also maintains a vacuum in the latter, thereby retaining the cover upon the pail. By mounting the casing 18 in the position shown, and providing it with a removable cover, it is possible to get at the check valve for cleaning or regrinding by simply removing the cover and without interfering with the connections to the milk pail and pulsator valve casing.

In order to prevent the milk spray from passing into the vacuum supply pipe, the pipe 20 may be filled with wire gauze 22, or other material adapted to absorb or entrap the spray, this material being held in place by suitable means, as by the removable bushing 23 screwing into the lower end of the pipe. By removing this bushing the gauze may be removed whenever necessary for cleaning or replacement. In the construction illustrated in Figs. 3 and 4 the gauze is preferably arranged in the form of a coil or roll, so that the air and spray pass through it. In Fig. 10 a modified construction of strainer or trap is illustrated in which the gauze 80 is arranged in the shape of a cone, it being supported in the pipe 20 by means of the removable bushing 23, and being preferably provided with three or more arms 81 at its upper end which hold it in vertical position. Any other suitable arrangement of the gauze may be employed.

Projecting from the chamber 16 are one or more nipples 24, to which are connected the flexible pipes (not shown) leading to the teat cups. Where double-chambered teat cups are used the pipes connected to the nipples 24 preferably lead to the outer chambers of the cups, while the inner chambers of the cups through which the milk is withdrawn are connected by other flexible pipes (not shown) to nipples 25, projecting from valve casings 26, mounted on the milk pail cover (see Figs. 1 and 2). This arrangement of teat cups is well understood and is illustrated and described in the application of Macartney, Serial No. 10,904, above referred to, and such illustration and description are not, therefore, repeated herein. With this arrangement it will be understood that no milk is drawn through the pipes connected to the nipples 24 and therefore no milk passes through the pulsator valve casing.

The valve casing may have secured to its upper end a carrying handle 27, and hooks 28, on which to hang the teat cup claws when not in use.

Reciprocating in the casing 12 is the pulsator valve 29 which is connected by means of the short piston rod 30 to the driving piston 31, the latter reciprocating in the cylinder 9. The valve 29 has a recess 32 on one side thereof adapted to register at proper times with the outlet port 13, while on the other side the valve has a recess 33 which at the same time registers with the port 14. The recesses 32 and 33 are connected by a transverse passage 34. When the valve is in its upper position, as is shown in Fig. 3, the chamber 16, and consequently the nipples 24, and the associated pipes and teat cup chambers are connected with the source of vacuum through the lower port 14, recesses 32 and 33, passage 34 and port 13. When, however, the valve is moved to its lower position, as shown in Fig. 4, the ports 13 and 14 are closed so that the vacuum supply is cut off, while the chamber 16, nipples 24 and pipes and teat cup chambers are open to atmospheric pressure through the upper port 15, the part of the valve chamber 12 above the valve 29 being at all times open to the atmosphere through the hole 35 in the top of the chamber.

The valve 29 is caused to reciprocate by the force of atmospheric pressure acting alternately upon the top and bottom of the piston 31, the other side of the piston being subjected to the vacuum. In order to admit the vacuum and atmospheric pressure in proper sequence to the cylinder 9 above and below the piston, any suitable reversing valve mechanism may be employed, preferably a mechanism substantially like that described and illustrated in the application of Macartney, Serial No. 10,904, above referred to. Such a mechanism is illustrated in the present case, and comprises a valve member 36, embodying certain novel features which will be referred to more particularly hereinafter, and which is pivoted at one end on a pin 37, which is carried by a block 38 which forms a valve seat. The block 38 has three ports, the central one 39 of which (shown in dotted lines, Figs. 2 and 7) is connected to the passage leading to the vacuum port 13. The upper port 40 in the valve seat is connected by a passage 41 to the cylinder 9, above the piston 31, while the lower port 42 is connected by a passage 43 with the cylinder below the piston. The lower end of the cylinder is preferably provided with a counter-bore 44, into which the passage 43 opens, thereby facilitating the boring of this passage, and permitting it to be made straight at its lower end and avoiding the necessity of providing a branch passage or hole in the side wall of the cylinder. The valve member 36, shown in Figs. 6, 7 and 11, is preferably constructed in two parts, one of which 45 may be termed the valve carrier, while the other part 46 is the valve disk or valve proper. The valve disk 46 has a recess or port 47 formed therein, which is adapted to overlie the ports 39, 40 and 42 in the valve seat 38, and to connect the port 39 with one or the other of the ports 40 and 42, depending upon the position of the valve, the other of said ports 40 and 42 being open to the atmosphere (see Fig. 7). The valve disk 46 fits loosely in a recess 45ª in the valve carrier 45, it being held from turning therein in any suitable manner, as by having a notch 48 formed in one side thereof which engages with a pin 49, fitting in a hole 50 in the valve carrier. The valve disk is also preferably provided with a small projection 51 on its back which engages with a hole 52 at the bottom of the recess in which the valve disk is carried. The presence of this small projection prevents the disk from being accidentally inserted in its recess with its wrong side adjacent the seat. The advantage of making the valve disk separate from the valve carrier is that a tight seating of the valve is insured at all times, this resulting from the fact that it is a vacuum valve and is thereby sucked toward its seat by the vacuum acting through the port 39. As the valve is independent from the carrier, the latter need not be so accurately fitted, and any twist to which the valve carrier is subjected by its operating mechanism cannot have any tendency to lift the valve away from its seat. This construction of valve which is capable of movement independently of the valve carrier I regard as a valuable feature of my invention. In some cases it is desirable to employ resilient means to retain the valve disk in contact with the valve seat so as to prevent leakage between the disk and its seat which might occur during the shifting of the valve and so prevent the vacuum from drawing the disk against the seat in the intended manner. Such resilient means may be of any suitable form, such for instance, as the light spider spring 90, shown in Figs. 6 and 11.

In Figs. 8 and 9 I have illustrated a modified construction of the reversing valve in which a port 47 is preferably formed in each face of the valve, these ports being conveniently made by pressing rounded indentations in the valve. By making a port in each face it makes no difference which side of the valve is placed adjacent to the valve seat so that the user of the machine cannot make the mistake of inserting the valve in such a way as to prevent the apparatus from working.

Any suitable mechanism for reciprocating the reversing valve may be employed, preferably that illustrated, which is the same as that described in the said application of Macartney, Serial No. 10,904, above referred to. This mechanism consists of a lever 53 which is pivoted at one end upon the pin 37, and which is provided with a slot 54. Working in this slot is a pin 55 which also projects through a slot 56 in the side of the casing 12, and is carried by the pulsator valve 29. The lever 53 has an angular projection 57 at its outer end, which has a hole 58 formed therethrough. Projecting through this hole is a plunger 59, the head 60 of which is pivoted to the pin 49, one end of which is mounted in the hole 50 in the valve carrier 45, as already described, while the other end of the pin bears in a hole in an arm 61, pivoted to the pin 37. Mounted under compression stress between the arm 57 and the head 60, is a spring 62. Fig. 1 shows the pulsator valve, and consequently the pin 55 in upward position. When the pulsator valve and pin 55 move down it will be seen that the lever 53 will swing down about the pivot pin 37, the arm 57 carrying down with it the outer end of the plunger 59. When the pin 55 reaches its lowermost position, the plunger 59 has been moved down about the pivot 49 until it has passed the dead center so that the spring 62, acting on the plunger exerts an upward pressure upon the pin 49, which will throw the valve carrier and valve to upper position, as soon as the valve carrier is released by the latch mechanism to be described. This latch mechanism comprises a latch 63, pivoted at its lower end at the point 64, and having a curved slot 65 therein, the walls of which engage the pin 55. The latch 63 has a notch 66 in its side, which is adapted to coöperate with one or the other of the lugs 67 formed on the valve carrier. So long as one of these lugs is in engagement with the notch the valve carrier is maintained in one of its terminal positions. As the pin 55 moves down in the curved slot 65, however, it will cause the latch to swing about its pivot, the curved slot being so shaped that the latch will swing far enough to cause the notch 66 to disengage the lug 67 when the pulsator valve and pin 55 reach the limit of their stroke. At this time the plunger 59 has passed the dead center so that as soon as the notch disengages the lug of the valve carrier, the latter will be forced under the influence of the spring plunger to its opposite extreme position. This will reverse the connection of the ports 40 and 42 with the vacuum port 39, and the atmosphere, respectively, and will accordingly cause the atmospheric pressure to act upon the opposite side of the piston 31, thereby forcing the piston and pulsator valve to the opposite limit of their stroke. This movement of the pulsator valve, carrying with it the pin 55, will obviously again reverse the position of the valve 46 so that a continuous reciprocation of the piston and pulsator valve is produced, which will continue as long as the vacuum supply is maintained. It will be understood that any other suitable reversing valve mechanism may be employed, the particular feature of this mechanism, which forms a part of my present invention, being the construction of the valve carrier, and so that it may be held in engagement with its seat by the vacuum.

The construction of the pulsator valve and its casing and the arrangement of the connected ports 14 and 15 present certain features of advantage in that long bearing surfaces for the valve are provided in the casing, thereby reducing the wear and eliminating leakage. It will be seen that the valve casing 12 has a slot 56 in one side thereof, through which the pin 55 projects. Atmospheric pressure is thus permitted to act on the side of the valve near this slot. If it be attempted to use an ordinary piston valve in which the connection from one side of the valve to the other is around the side of the valve, an unbalanced pressure would be produced which would tend to force the valve too tightly against the side of the casing opposite from the slot, thereby wearing the casing eccentrically. I overcome this objection by using instead of a piston valve of the usual form with an opening around the valve, the construction shown in which the two recesses 32 and 33 are connected by an opening 34 through the interior of the valve. In this way the vacuum does not reach the side of the valve opposite to the slot, and therefore no unbalanced pressure is produced. The bottoms of the recesses 32 and 33 are preferably curved, as shown in Fig. 5, this construction facilitating the manufacture.

The use of the two connected ports 14 and 15 permits the recesses 32 and 33 to be formed well down below the top of the valve, thereby permitting a long cylindrical bearing surface above the recesses, which prevents leakage. At the same time the stroke of the valve need not be unduly lengthened. This results from the fact that when the valve is in its upper position, connection may be made through the recesses and the passage 34, between the port 3 and the lower port 14, thereby connecting the teat cups with the suction, while in order to connect the teat cup chambers with atmospheric pressure, it is only necessary for the valve to move down sufficiently far for its upper end to open the upper port 15. At the same time the cylindrical upper end of the valve tightly closes the vacuum port 13 and prevents the leakage of air into this port. Also by having the air admission port 15 at a different level from the port 14, it is possible to place the latter at substantially the same level as the vacuum outlet port 13, it thus being possible to make the recesses 32 and 33 comparatively short. This again permits the cylindrical bearing surfaces of the valve to be made long.

While I have illustrated and described in detail one preferred embodiment of my invention, I do not wish to be understood as thereby limiting myself to such detailed construction any further than specified in the claims, but I realize that my invention is capable of being embodied in various forms of apparatus, and I therefore desire to cover the principle of the same broadly in whatever form it may be embodied.

Having thus described my invention, I claim:

1. In pulsator mechanism for milking apparatus, the combination of a pulsator, vacuum operating means for actuating the same and valve mechanism actuated by said vacuum operating means, said valve mechanism including a valve seat, a valve carrier and a valve carried by said carrier and held in sliding engagement with said seat at all times by the action of the vacuum.

2. In pulsator mechanism for milking apparatus, the combination of a pulsator, vacuum operated means for actuating the same and control valve mechanism for controlling the action of the vacuum on said operating means, said control valve mechanism including a valve seat, a valve carrier and a valve movable with said carrier across said seat, but capable of independent movement toward and from said seat, said valve being held in engagement with said seat at all times by the action of the vacuum.

3. In pulsator mechanism for milking apparatus, the combination of a pulsator, vacuum operated mechanism for actuating the same, and control valve mechanism for controlling the action of said vacuum operated mechanism, said control valve mechanism including a valve seat, a valve carrier movable thereover, means actuated by the movements of the vacuum operated mechanism for moving said valve carrier, and a valve member loosely mounted in a recess in said valve carrier.

4. In pulsator mechanism for milking apparatus, the combination of a pulsator valve, vacuum operated mechanism for actuating the same, and control valve mechanism for controlling the action of said vacuum operated mechanism, said control valve mechanism including a valve seat having ports therein, one of said ports being in constant communication with a source of vacuum, a valve carrier movable over said valve seat, actuating means for said valve carrier, said valve carrier having a recess therein adjacent to said valve seat, and a valve member loosely mounted in said recess and having a recess in its face adapted to connect said vacuum port in the valve seat with one of the other ports therein, said valve member being held in contact with its valve seat by the action of the vacuum.

5. In pulsator mechanism for milking apparatus, the combination of a pulsator valve, vacuum operating means for actuating the same, and control valve mechanism for controlling the action of the vacuum on said operating means, said control valve mechanism including a valve seat, a valve carrier having a recess therein, and a valve mounted in said recess, said valve being so formed that it cannot be inserted in said recess in improper position.

6. In pulsator mechanism for milking apparatus, the combination of a casing having a cylindrical bore and ports formed in opposite sides thereof, a pulsator valve mounted to reciprocate in said bore and having cylindrical portions at the top and bottom thereof connected by a member having cylindrical side portions, said top and bottom portions and side portions fitting said bore, said valve having a transverse opening therethrough adapted to form a connection between the port in one side of said casing and the port in the other side thereof, and means for reciprocating said valve.

7. In pulsator mechanism for milking apparatus, the combination of a casing having ports therein and having a slot in the side thereof, a pulsator valve working in said casing and having a portion at one side thereof fitting the bore of said casing adjacent to the slot therein and having a second portion fitting the diametrically opposite side of the bore of said casing and having a passageway through the body thereof, whereby a balanced valve is produced, and means for reciprocating said valve.

8. In pulsator mechanism for milking apparatus, the combination of a casing having ports in opposite sides thereof and having a slot in the side thereof between said ports, a pulsator valve working in said casing and having recesses in opposite sides thereof adapted to communicate with said ports, said valve having side bearing portions engaging the side wall of said casing adjacent to said slot and the diametrically opposite wall of said casing respectively, and having an opening extending therethrough connecting the recesses in said valve, and means for reciprocating said valve.

9. In pulsator mechanism for milking apparatus, the combination of a casing having a port in one side thereof, and having a pair of ports arranged at different levels in the opposite side thereof, and a pulsator valve working in said casing, and having upper and lower portions fitting the same, and an intermediate portion provided with a passageway adapted to place the port in one side of the casing in communication with one of the ports in the other side of the casing, said valve being movable to a position to cover both of said last-named ports, and to open the second port at the other side of the casing.

10. In pulsator mechanism for milking apparatus, the combination of a casing having an outlet port in one side thereof, a chamber having connections for teat cups at one side of the casing, a vacuum inlet port opening from said casing into said chamber, an air inlet port opening from said casing into said chamber, a pulsator valve working in said casing, means for admitting air into said casing above said valve, said valve being formed to provide a passageway for placing said vacuum outlet port in communication in said vacuum inlet port in one position of the valve and to simultaneously cover said air inlet and being movable to another position to cover said vacuum ports and to uncover said air inlet port.

11. In pulsator mechanism for milking apparatus, the combination of a casing having a vacuum outlet port, a connection from said port to a source of vacuum, an atmospheric inlet opening, two connected inlet ports, a common connection from both of said ports for teat cups, and a pulsator valve working in said casing acting in one position to cover one of said inlet ports and place the second inlet port in communication with the vacuum outlet port, said valve acting in another position to cover said second inlet port and admit atmospheric pressure to said first inlet port.

12. In pulsator mechanism for milking apparatus, the combination of a milk pail cover, a casing mounted thereon having a bore for a pulsator valve, and a bore forming a cylinder, a pulsator valve working in said first-named bore, a piston working in said cylinder and connected to said pulsator valve, a valve seat formed on the side of said casing, ports in said valve seat, control valve mechanism governing said ports, passages leading from said ports to said cylinder above and below said piston, the lower end of said casing adjacent to its point of attachment to said cover having a counterbore formed therein, one of said passages opening into said counter-bore.

13. In milking apparatus, a milk pail cover comprising two superimposed sheet metal members, the upper member being of larger diameter than the lower member and having a downwardly turned flange at its periphery, and having an annular offset, the lower member fitting said annular offset and having a downwardly turned flange at its periphery.

14. In milking apparatus, a milk pail cover comprising superimposed sheet metal members, having spaced downwardly turned peripheral flanges, the upper member having a raised central portion to form a seat for the pulsator valve casing, and a filler between said raised portion and the lower member of the cover to provide stock for engagement with attaching means for the casing.

15. In milking apparatus, the combination with a milk pail cover of a pulsator valve casing mounted thereon, a check valve casing, a connection from said check valve casing to said pulsator valve casing, a connection from said check valve casing to the milk pail cover, a check valve mounted in said casing and controlling said connection to the milk pail cover, and a removable cover for said check valve casing permitting access to said valve.

16. In milking apparatus, the combination with a milk pail cover of a pulsator valve casing mounted thereon, a check valve casing, a connection from said check valve casing to said pulsator valve casing, a connection from said check valve casing to the milk pail cover, a check valve mounted in said casing and controlling said connection to the milk pail cover, and a removable cover for said check valve casing permitting access to said valve, said cover having a nipple for connection with a vacuum pipe.

17. In milking apparatus, a milk pail, a milk pail cover, a pipe connected to said cover, an air filter mounted in said pipe, a check-valve casing connected to said pipe and a connection to said check valve casing through which air may be exhausted from said milk pail through said air filter and check valve.

18. In milking apparatus, a milk pail, a pipe through which air may be exhausted from said pail and a removable, cone-shaped, gauze air filter in said pipe.

19. In milking apparatus, a milk pail cover, a pulsator valve casing mounted thereon, a check valve casing, a connection from said check valve casing to said pulsator valve casing, a connection from said check valve casing to the milk pail cover, a check valve in said casing controlling said last-named connection, gauze mounted in said last-named connection and a removable bushing for holding said gauze in position.

20. In pulsator mechanism for milking apparatus, the combination of a valve seat having ports therein, at least one of which is a vacuum port, a valve carrier mounted to slide over said seat and having a recess formed in the portion thereof movable over said ports and a valve member having a recessed face adapted to slide in sealing contact with the valve seat, said valve member being mounted in said recess in the valve carrier for free movement in the direction of the valve seat and being adapted to be held against said seat by the action of the vacuum.

21. In pulsator mechanism for milking apparatus, the combination of vacuum operating means, a valve carrier, a connection from said vacuum operating means to said carrier for actuating the same, a valve seat, and a valve carried by said carrier and held in engagement with said seat at all times by the action of the vacuum, said valve being mounted independently of the valve carrier supporting and actuating means so as to be incapable of displacement from sealing contact with said valve seat through the action of said actuating means.

22. In pulsator mechanism for milking apparatus, the combination of a pulsator, vacuum operated mechanism for actuating the same, and control valve mechanism for controlling the action of the vacuum on said operating means, said control valve mechanism including a valve seat, a movable valve carrier having a recess therein, a valve mounted in said recess and resilient means acting on said valve for urging it toward said seat.

23. In pulsator mechanism for milking apparatus, the combination of a pulsator, vacuum operated mechanism for actuating the same and control valve mechanism for controlling the action of the vacuum on said operating means, said control valve mechanism including a valve seat, a movable valve carrier having a recess therein, a valve freely mounted in said recess, and a spider spring inserted in said recess back of said valve and urging said valve against said seat.

24. In pulsator mechanism for milking apparatus, the combination of a valve seat having a vacuum port therein, a valve carrier resting upon and movable over said seat and a valve carried by said carrier and held in engagement with said seat at all times by the action of the vacuum.

25. In pulsator mechanism for milking apparatus, the combination of a valve seat having a plurality of ports therein, at least one of which is a vacuum port, a valve carrier mounted on said seat and movable over said ports and having a recess in its face adjacent to said seat and a valve freely mounted in said recess and adapted to slide on said seat to control said ports, said valve being held in engagement by said seat by the action of the vacuum.

26. In pulsator mechanism for milking apparatus, the combination of vacuum operating means, a valve carrier having a recess therein, a valve seat, a valve carried by said carrier, in said recess and adapted to slide over said seat and to be held in contact therewith by vacuum, said valve being capable of free movement in said recess in the direction of the valve seat, a pivoted member for actuating said carrier, a pivoted member operated by said vacuum operating means and a spring for transmitting power from the latter to the former of said pivoted members for actuating said valve carrier and valve.

27. In pulsator mechanism for milking apparatus, the combination of vacuum operating means, a valve seat, having ports therein, at least one of which is a vacuum port, a valve carrier pivoted at one side of said seat and having a portion with a recess therein adapted to swing over the ports in said seat, a valve member having a recessed face adapted to slide in sealing contact with the valve seat, said valve member being mounted in said recess in the valve carrier for free movement in the direction of the valve seat, and means whereby the valve carrier is caused to oscillate over said seat upon the movement of said vacuum operating means.

28. In pulsator mechanism for milking apparatus, the combination of vacuum operating means, a valve seat having ports therein, at least one of which is a vacuum port, a valve carrier pivoted at one side of said seat and having a portion with a recess therein adapted to swing over the ports in said seat, a valve member having a recessed face adapted to slide in sealing contact with the valve seat, said valve member being mounted in said recess in the valve carrier for free movement in the direction of the valve seat, but being held against any movement in said recess in a plane parallel to the valve seat, and means whereby the valve carrier is caused to oscillate over said seat upon the movement of said vacuum operating means.

ROBERT WARNOCK.